United States Patent
Cong et al.

(10) Patent No.: US 10,622,826 B2
(45) Date of Patent: Apr. 14, 2020

(54) WIRELESS CHARGING UNIT FOR AN ELECTRIC VEHICLE

(71) Applicant: LEAR CORPORATION, Southfield, MI (US)

(72) Inventors: Steven Cong, Southfield, MI (US); David A. Hein, Sterling Heights, MI (US); Ajmal Imran Ansari, Canton, MI (US); Eric Salem, Berkley, MI (US)

(73) Assignee: LEAR CORPORATION, Southfield, MI (US)

( * ) Notice: Subject to any disclaimer, the term of this patent is extended or adjusted under 35 U.S.C. 154(b) by 142 days.

(21) Appl. No.: 15/793,301

(22) Filed: Oct. 25, 2017

(65) Prior Publication Data

US 2019/0118658 A1 Apr. 25, 2019

(51) Int. Cl.
| | | |
|---|---|---|
| *H02J 7/00* | (2006.01) | |
| *H02J 50/10* | (2016.01) | |
| *B60L 53/12* | (2019.01) | |
| *B60L 53/66* | (2019.01) | |
| *B60L 53/122* | (2019.01) | |
| *H02J 7/02* | (2016.01) | |

(52) U.S. Cl.
CPC .............. *H02J 7/025* (2013.01); *B60L 53/12* (2019.02); *B60L 53/122* (2019.02); *B60L 53/66* (2019.02); *H02J 7/0042* (2013.01); *H02J 50/10* (2016.02)

(58) Field of Classification Search
CPC .......... H02J 7/025; H02J 7/0042; H02J 50/10; B60L 523/12; B60L 523/66; B60L 523/122; B60L 53/12; B60L 53/66; B60L 53/122

USPC .......................... 320/109, 108, 104, 112, 115
See application file for complete search history.

(56) References Cited

U.S. PATENT DOCUMENTS

| | | | |
|---|---|---|---|
| 2009/0179806 A1* | 7/2009 | Ji .......................... | G06F 1/1616 343/702 |
| 2009/0185340 A1* | 7/2009 | Ji ....................... | B29C 45/14786 361/679.21 |
| 2011/0035074 A1* | 2/2011 | Davison .............. | H02J 13/0075 700/295 |
| 2012/0181973 A1* | 7/2012 | Lyden ..................... | H02J 3/383 320/101 |
| 2012/0262002 A1 | 10/2012 | Widmer et al. | |
| 2013/0015812 A1* | 1/2013 | Boyer ................. | B60L 11/1829 320/108 |
| 2014/0091758 A1* | 4/2014 | Hidaka ................... | H01F 38/14 320/108 |
| 2015/0326061 A1 | 11/2015 | Davison et al. | |

(Continued)

*Primary Examiner* — Phallaka Kik
(74) *Attorney, Agent, or Firm* — Brooks Kushman P.C.

(57) ABSTRACT

A wireless charging unit for an electric vehicle is provided with a metal enclosure to shield a high-power switching noise environment enclosed within the unit. A wireless power transfer system includes the wireless charging unit on the electric vehicle side that receives power wirelessly from a charging base. In addition to a high-power switching network, the wireless charging unit may include a wireless communication system for wirelessly communicating control messages to the charging base. The metal enclosure may include a cutout region having a plastic cover underneath which an antenna may be mounted to establish wireless communication with the charging base from within the metal enclosure.

11 Claims, 4 Drawing Sheets

(56) References Cited

U.S. PATENT DOCUMENTS

| | | | |
|---|---|---|---|
| 2016/0072303 A1* | 3/2016 | Jeong | H01Q 1/243 |
| | | | 307/104 |
| 2016/0141882 A1* | 5/2016 | Ichikawa | H02J 7/025 |
| | | | 307/104 |
| 2016/0172744 A1* | 6/2016 | Plunkett | H01Q 1/2266 |
| | | | 343/702 |
| 2016/0204499 A1* | 7/2016 | Toh | H01Q 1/24 |
| | | | 343/702 |
| 2016/0344230 A1* | 11/2016 | Chan | H02J 7/007 |
| 2017/0223807 A1* | 8/2017 | Recker | H05B 37/0272 |
| 2018/0191882 A1* | 7/2018 | Kim | H02J 7/0044 |
| 2018/0212475 A1* | 7/2018 | Noh | H01F 38/14 |
| 2019/0028149 A1* | 1/2019 | Pifferi | H02J 7/0027 |

\* cited by examiner

WIRELESS CHARGING UNIT FOR AN ELECTRIC VEHICLE

TECHNICAL FIELD

The present invention relates to a wireless charging unit and corresponding enclosure on the vehicle side of an inductive power transfer system such as for wirelessly charging electric vehicles.

BACKGROUND

Wireless power transfer systems enable power to be transferred wirelessly from a source to a load. Inductive power transfer is a non-radiative, or near-field, type of wireless power transfer. Inductive power transfer uses an oscillating current passing through a primary coil (i.e., a transmit antenna) of a source to generate an oscillating magnetic near-field that induces currents in a secondary coil (i.e., a receive antenna) of a load. The source includes a power converter having power transistor switches which switch at controllable times to convert power of the source into the oscillating current passing through the primary coil.

Inductive power transfer is performed to wirelessly charge a load, such a traction battery of an electric vehicle, using power from the source. In such wireless electric vehicle charging systems, the transmit antenna of the source is embedded in a "charging" mat and the receive antenna (and an associated rectifier) is embedded in a designated location of the vehicle. The inductive power transfer involves inductive coupling between the antennas.

An electric vehicle requires frequent charging of the traction battery. In wired charging connections, an electric vehicle's on-board charger is connected to electric vehicle supply equipment (EVSE), such as a charging station, using a cordset plugged into a vehicle's charging port. A wired control loop between the on-board charger and the EVSE is used to monitor the battery charger output while the cordset is plugged in to the charging port. Upon a detection of any unexpected problems, the wired control loop may immediately shut down the output from the charging station to protect the traction battery from damage. In wireless charging systems, the control loop is likewise wireless, relying on near-field communication protocols such as WiFi, Bluetooth, etc. to communicate with the power source. The wireless charger on the vehicle side is contained in a metal enclosure to shield the high-power switching noise environment. Vehicle-side antennas used in the wireless communication are mounted outside the metal enclosure to freely radiate the RF signal.

SUMMARY

One or more embodiments of the present disclosure are related to a wireless charging unit for a vehicle comprising a metal enclosure for enclosing a high-power switching network. The metal enclosure may include a cutout region. A plastic cover may be affixed to the metal enclosure overlapping the cutout region. An antenna may be mounted to an underside of the plastic cover. A wireless communication control board may be disposed within the metal housing. A cable may connect the antenna to the wireless communication control board.

The antenna may be a chip antenna mounted to an antenna board. The metal enclosure may include a metal housing and a metal cover, with the cutout region being in the metal cover. The wireless charging unit may further include a seal disposed along a perimeter of the cutout region between the metal cover and the plastic cover. The underside of the plastic cover may include a wall surrounding an internal surface. The wall may extend toward an interior of the metal enclosure along a perimeter of the cutout region. The internal surface may be exposed to the interior of the metal enclosure. The wall may include an outer surface having a canal for receiving a seal.

The internal surface may include mounting posts extending therefrom, with the antenna board being mounted to the posts. The internal surface may also include a recess for the antenna that allows the antenna board to be closer to the internal surface. The plastic cover may include a flange surrounding the wall. The flange may overlap the metal cover around the perimeter of the cutout region. The flange may include a channel adjacent the wall. The wireless charging unit may further include an outwardly-extending rim formed in the metal cover surrounding the cutout region. The rim may be seated inside the channel in the flange.

One or more additional embodiments of the present disclosure are related to a plastic cover for a metal enclosure. The metal enclosure may enclose a wireless communication system and a high-power switching network. The plastic cover may include an underside for facing an interior of the metal enclosure, a wall extending from the underside toward the interior, an internal surface surrounded by the wall, and a flange surrounding the wall configured to overlap the metal enclosure.

The plastic cover may further include a plurality of mounting posts extending from the internal surface. The internal surface may include a recess configured to accommodate an antenna. The plastic cover may further include a channel formed in the flange adjacent to the wall. A canal, for receiving a seal, may be formed in an outer surface of the wall.

One or more additional embodiments of the present disclosure are related to a metal enclosure for enclosing a high-power switching network and a wireless communication system. The metal enclosure may include a metal housing defining an interior of the metal enclosure and a metal cover affixed to the metal housing. The metal cover may include a cutout region. A plastic cover may be affixed to the metal cover overlapping the cutout region. A seal may be disposed along a perimeter of the cutout region between the metal cover and the plastic cover.

An underside of the plastic cover may include a wall surrounding an internal surface. The wall may extend toward the interior of the metal enclosure along the perimeter of the cutout region and the internal surface may be exposed to the interior of the metal enclosure. The metal enclosure may further include an antenna mounted to the underside of the plastic cover, a wireless communication control board disposed within the metal housing, and a cable connecting the antenna to the wireless communication control board. The internal surface may include a recess that receives the antenna.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
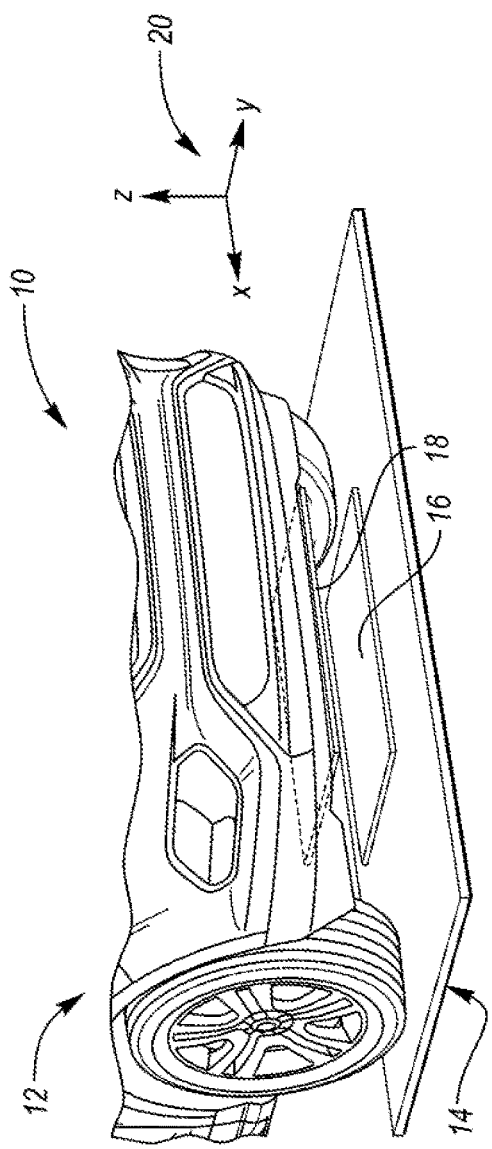
FIG. 1 is a schematic diagram of an inductive power transfer system for wirelessly charging an electric vehicle with power from a charging base.

Referring now to FIG. 1, a schematic diagram of an inductive power transfer system 10 for wirelessly charging an electric vehicle 12 with power from a charging base 14 is shown. The charging base 14 includes a transmit antenna 16 positioned in the ground or on the floor of a structure. The transmit antenna 16 is sometimes referred to a base pad or mat due to its physical configuration. The vehicle 12 includes a receive antenna 18, often referred to as a vehicle pad, mounted to the underside of the vehicle. The transmit antenna 16 and the receive antenna 18 are aligned in close arrangement when the vehicle 12 is properly parked. Power of the charging base 14 can thus be transferred from the transmit antenna 16 to the receive antenna 18 for charging the vehicle 12. The receive antenna 18 is connected to the traction battery or the like of the vehicle 12. The power wirelessly transferred from the charging base 14 to the vehicle 12 is used to charge the traction battery.

A coordinate system 20 is also shown in FIG. 1. In the coordinate system 20, the transmit antenna 16 and the receive antenna 18 are separated along thee-direction when the vehicle 12 is parked over the transmit antenna. The vehicle 12 (particularly the receive antenna 18) can be displaced relative to the transmit antenna 16 along either the x-direction and the y-direction (i.e., relative to the ground or floor in which the transmit antenna is positioned). Displacement of the receive antenna 18 from a preset optimal aligned position relative to the transmit antenna 16 in any of the coordinate directions decreases the efficiency with which power can be wirelessly transferred from the transmit antenna to the receive antenna. In this regard, displacement of the receive antenna 18 relative to the transmit antenna 16 changes the impedance seen by the power generating component of the charging base 14 that feeds the transmit antenna with power.

Figure 2:
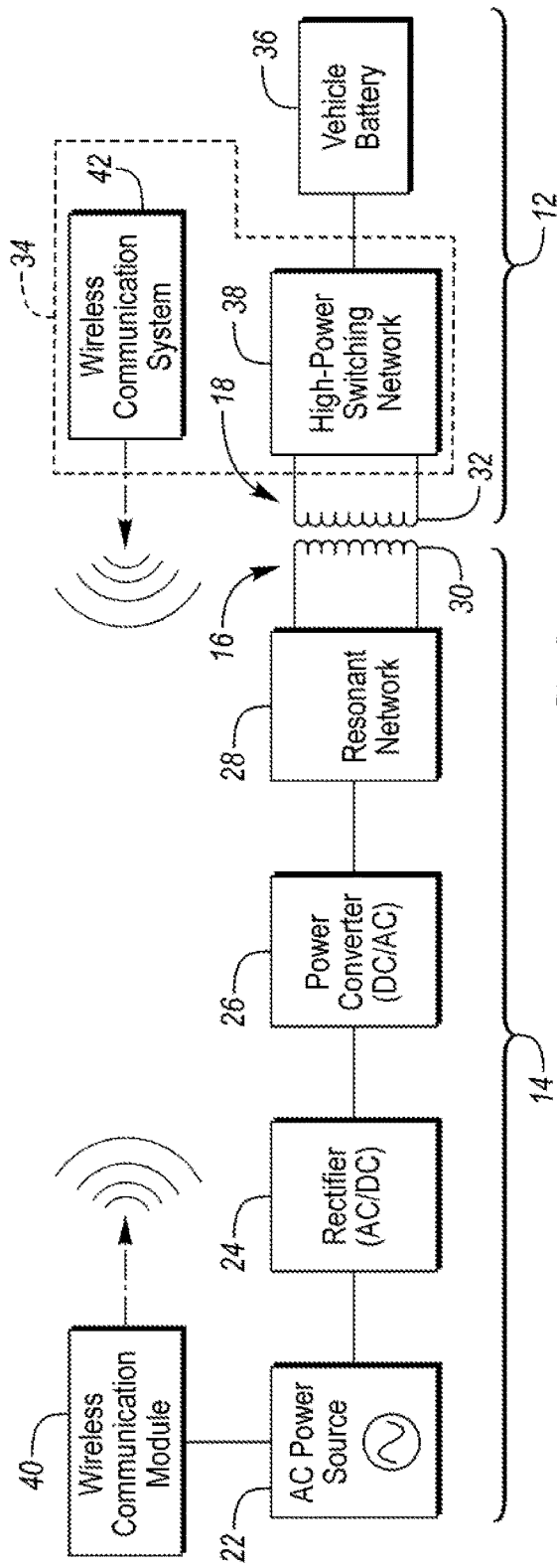
FIG. 2 is a block diagram of the inductive power transfer system.

Referring now to FIG. 2, with continual reference to FIG. 1, a block diagram of the inductive power transfer system 10 is shown. As shown in FIG. 2, in addition to the transmit antenna 16, the charging base 14 of the inductive power transfer system 10 includes an AC (alternating current) power source 22, an AC/DC (alternating current/direct current) rectifier 24, a DC/AC power converter 26, and a resonant network 28. The power source 22 provides AC power to the rectifier 24. The rectifier 24 rectifies the AC power to DC power and provides the DC power to the power converter 26. The power converter 26 converts the DC power into AC power and provides the AC power to the resonant network 28.

The transmit antenna 16 includes one or more coils (i.e., primary coil 30). The receive antenna 18 of the vehicle 12 includes one or more coils (i.e., secondary coil 32). The primary coil 30 and the secondary coil 32 are physically arranged next to one another (i.e., "loosely coupled") when the vehicle 12 is properly parked. That is, the secondary coil 32 wirelessly couples with the primary coil 30 when the secondary coil is in the coupling-mode region of the primary coil providing a mutual inductance M and resonating at substantially the same frequency as the primary coil. The AC power from the power converter 26 passes through the resonant network 28 and through the primary coil 30 and causes the primary coil to generate an oscillating magnetic near-field. The oscillating magnetic near-field induces currents in the secondary coil 32. The currents in the secondary coil 32 generate AC power on the vehicle side. As such, an inductive coupling between the primary coil 30 and the secondary coil 32 occurs for inductive power transfer from the charging base 14 to the vehicle 12.

As further shown in FIG. 2, in addition to the receive antenna 18, the vehicle 12 may include a wireless charging unit 34. Together, the receive antenna 18 and the wireless charging unit 34 may be referred to as a wireless charging system. The wireless charging unit 34 delivers power to a load of the vehicle 12, such as a vehicle battery 36 (i.e., traction battery), through a high-power switching network 38. The high-power switching network 38 may include, among other things, an AC/DC rectifier (not shown) that rectifies the AC power from secondary coil 32 into DC power. The DC power from the rectifier may be supplied to the vehicle battery 36 through, for example, a filter (not shown). This DC power at the output of the wireless charging unit 34 charges the vehicle battery 36.

In wireless charging systems, the control loop is likewise wireless, relying on near-field communication protocols such as WiFi, Bluetooth, etc. to communicate between the vehicle 12, namely the wireless charging unit 34, and the charging base 14. For instance, the wireless charging unit 34 may send a message wirelessly to the charging base 14 to notify the charging base when charging is completed, or when a charging error is detected, so that the charging base 14 may shut down the AC power source 22. Accordingly, the charging base 14 may include a wireless communication module 40 for transmitting and receiving wireless communications from the vehicle 12 and, in particular, the wireless charging unit 34. Likewise, the wireless charging unit 34 may include a wireless communication system 42 for transmitting and receiving wireless communications from the charging base 14.

Figure 3A:
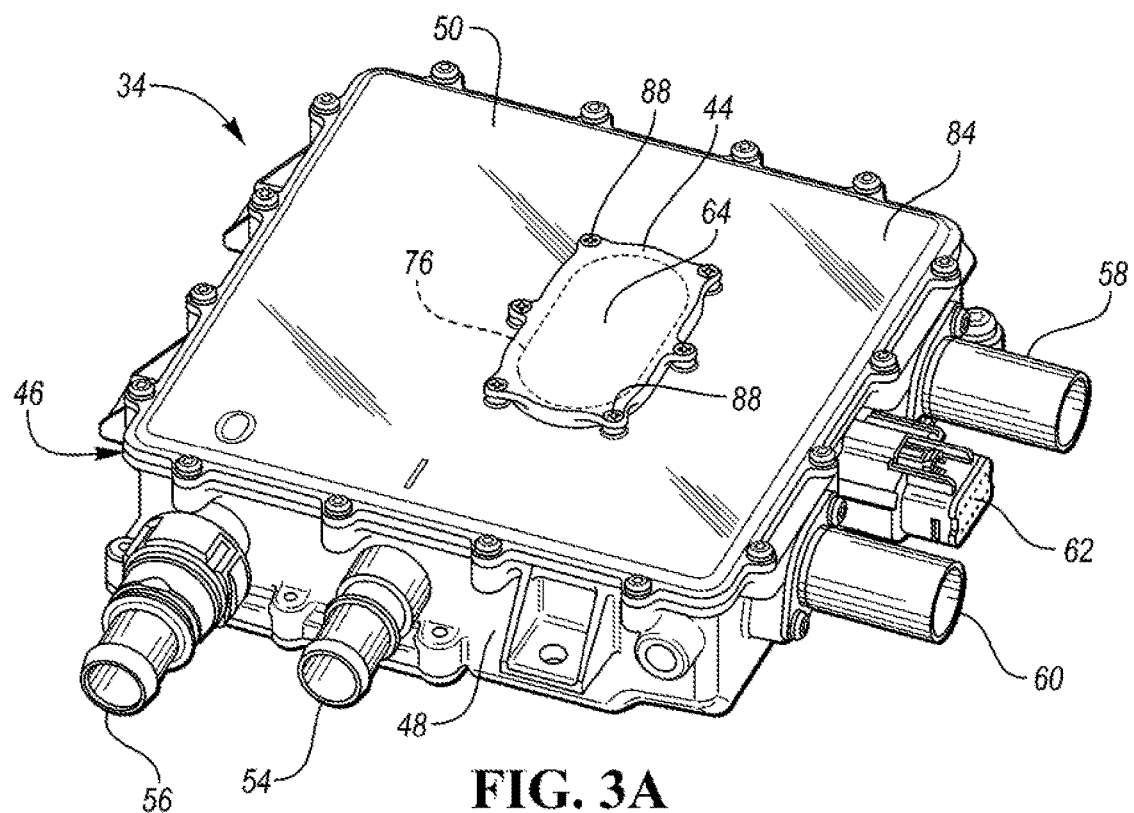
FIG. 3a is a perspective view of a wireless charging unit, forming part of the inductive power transfer system, including a plastic cover.

FIG. 3a is a perspective view of the wireless charging unit 34 including a plastic cover 44. As shown, the wireless charging unit 34 may include a metal enclosure 46 enclosing at least the high-power switching network 38 and the wireless communication system 42. The high-power switching network 38 generates a high-power switching noise environment. The metal enclosure 46 effectively shields this high-power switching noise environment to limit electromagnetic interference, caused by the high-power switching network 38, outside the wireless charging unit 34.

The metal enclosure 46 may include a metal housing 48 and a metal cover 50 defining an interior 52 (FIG. 5) of the metal enclosure. The metal housing, 48 may include coolant inlet 54 and a coolant outlet 56 defining a cooling circuit (not shown) in the interior 52 of the metal enclosure 46. The wireless charging unit 34 may be liquid- or air-cooled using the cooling circuit. The metal enclosure 46 may further include a powerline inlet 58 and a powerline outlet 60. As previously described, the currents induced in the secondary coil 32 of the receive antenna 18 generate AC power on the vehicle side. The AC power is delivered to the wireless charging unit 34 at the powerline inlet 58 via a powerline (not shown). The wireless charging unit 34 rectifies the AC power into DC power and the DC power may exit the wireless charging unit 34 along the powerline at the powerline outlet 60 to be supplied to the vehicle battery 36. The metal enclosure 46 may also include a control connector 62 that connects control electronics inside the wireless charging unit 34 to an in-vehicle control network (e.g., CAN) bus.

Wireless communications transmitted from, and received by, the wireless communication system 42 inside the wireless charging unit 34 need to be able to radiate to the air freely to setup a communication Channel with the charging base 14. Normally, if an antenna is mounted inside of a metal enclosure with a high-power switching noise environment, the metal enclosure will block the antenna's RF waveform radiation to the air and kill this wireless communication. To combat this, the metal enclosure 46 may include a cutout region 64 covered by the plastic cover 44. According to an embodiment, the cutout region 64 may be formed in the metal cover 50. The plastic cover 44 may overlap the cutout region 64 and be affixed to the metal enclosure 46 (e.g., the metal cover 50), effectively sealing the metal enclosure at the cutout region from external elements.

Figure 3B:
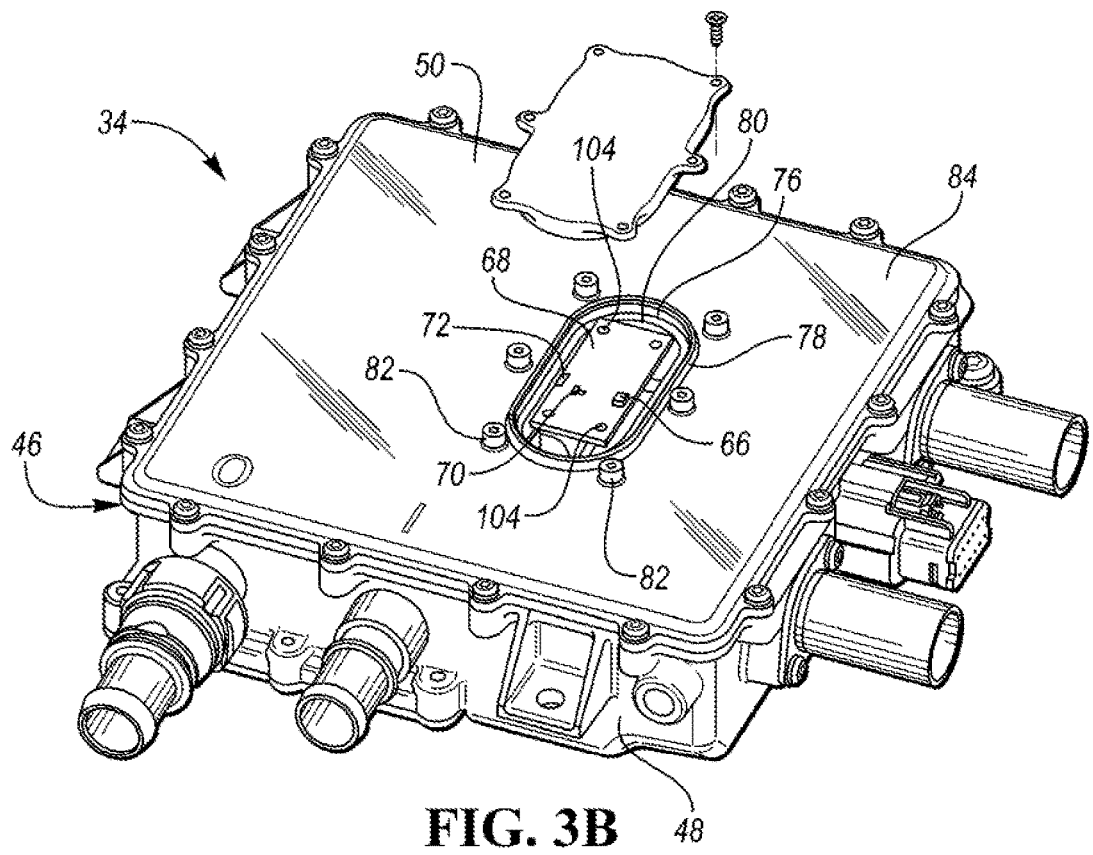
FIG. 3b is a perspective view of the wireless charging unit without the plastic cover.

FIG. 3b is a similar perspective view of the wireless charging unit 34 with the plastic cover 44 removed. As shown, an antenna 66 may be disposed within the cutout region 64, just below the location of the plastic cover 44 shown in FIG. 3a. According to an embodiment, the antenna 66 may be a chip antenna mounted to an antenna board 68 in proximity to the cutout region 64. Moreover, the antenna board 68 may also include an LC filter 70 and a connector used to connect a cable, as described in greater detail below. As will be described in greater detail, the antenna 66 and antenna board 68 may be directly mounted to an underside 74 (FIG. 4) of the plastic cover 44. With the antenna 66 mounted to the underside of a plastic cover 44, provided in the metal enclosure 46 housing a high-power switching noise environment, adequate wireless communication between the wireless charging unit 34 and the charging base 14 can occur despite the metal enclosure. Moreover, the metal enclosure 46 may still properly shield the high-power switching noise environment, mitigating any electromagnetic interference.

Figure 4:
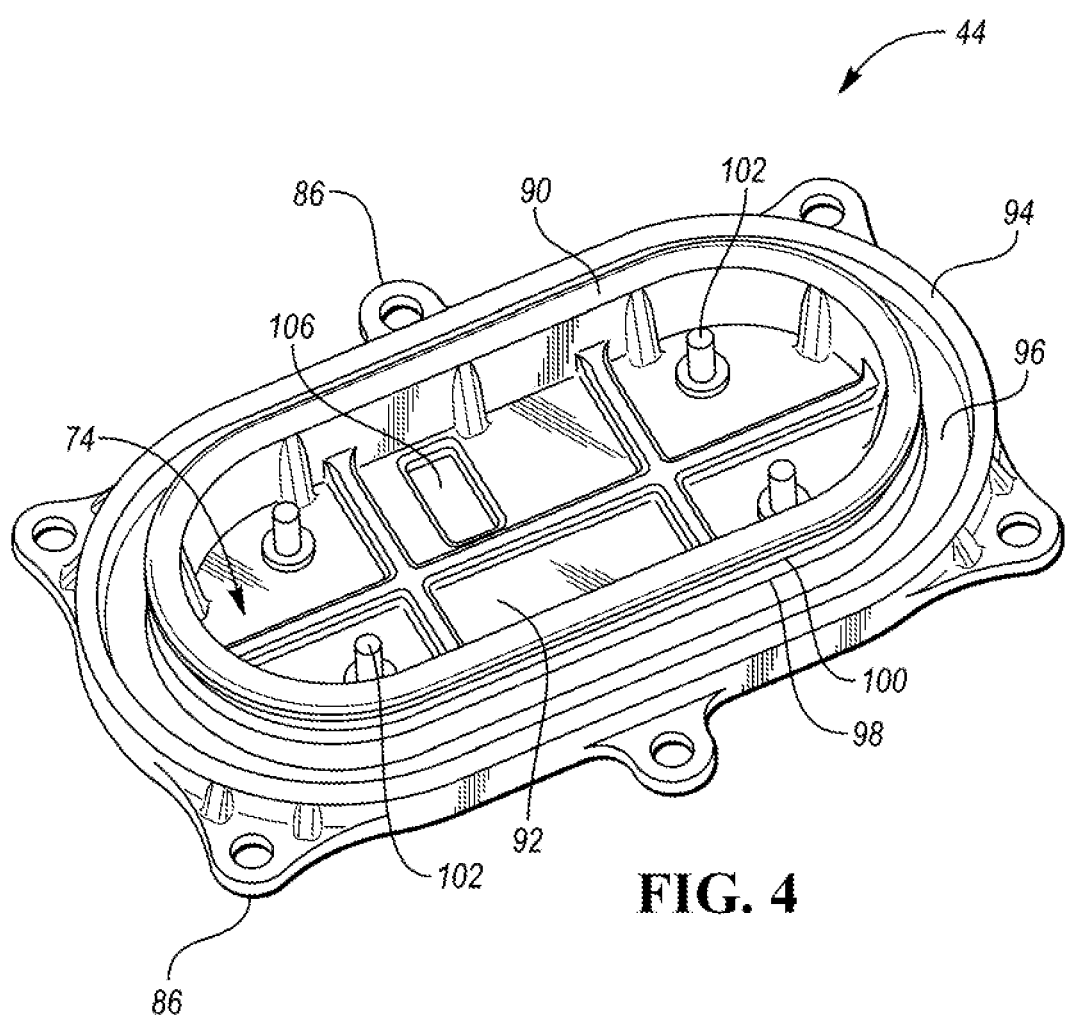
FIG. 4 is a perspective view of the plastic cover for the wireless charging unit.

A perimeter 76 of the cutout region 64 may be defined by an outwardly-extending rim 78 formed in the metal cover 50, which may help orient the plastic cover 44 and seal the metal enclosure 46. A seal 80 may be disposed just inside the perimeter 76 of the cutout region 64, as shown. According to an embodiment, the seal 80 may be affixed to the plastic cover 44 before it is attached to the metal enclosure 46, as will be described in further detail below. A plurality of posts 82 surrounding the cutout region 64 may extend from an outside surface 84 of the metal cover 50. Each post 82 may align with a corresponding tab 86 formed in the plastic cover 44 (FIG. 4). Each tab 86 and corresponding post 82 may be configured to receive a fastener 88 (e.g., a screw, rivet, etc.) for securely fastening the plastic cover 44 to the metal cover 50 (FIG. 3a). The number of fasteners 88 and corresponding tabs 86 and posts 82 should be sufficient to adequately seal the metal enclosure 46 during a wide range of temperatures and other environmental conditions.

FIG. 4 is a perspective view of the underside 74 of the plastic cover 44. According to an embodiment, the underside 74 of the plastic cover 44 may include a wall 90 surrounding or encircling an internal surface 92. When assembled, the internal surface 92 may be exposed to the interior 52 of the metal enclosure 46. Moreover, the wall 90 may extend from the internal surface 92 toward the interior 52 of the metal enclosure 46 along the perimeter 76 of the cutout region 64. A flange 94 may surround the wall 90 to the outside. When assembled, the flange 94 overlaps the metal cover 50 around the cutout region 64. The flange 94 may include a channel 96 adjacent the wall 90 for receiving the rim 78 formed in the metal cover 50. The wall 90 may include an outer surface 98 including a canal 100 for receiving the seal 80.

A plurality of mounting posts 102 may extend from the internal surface 92 of the plastic cover 44. The antenna board 68 may be mounted to the underside 74 of the plastic cover 44 using the mounting posts 102. For example, the antenna board 68 may include a corresponding plurality of mounting holes 104 (FIG. 3b) that can receive the mounting posts 102. The antenna board 68 may then be fixedly secured to the plastic cover 44 using any means known to one of ordinary skill in the art. The internal surface 92 of the plastic cover 44 may also include a recess 106 for the antenna 66. When assembled, the recess 106 may align with the antenna 66 that is surface mounted to the antenna board 68. The recess 106 for the antenna 66 may allow the antenna board 68 to be closer to the internal surface 92 of the plastic cover 44.

Figure 5:
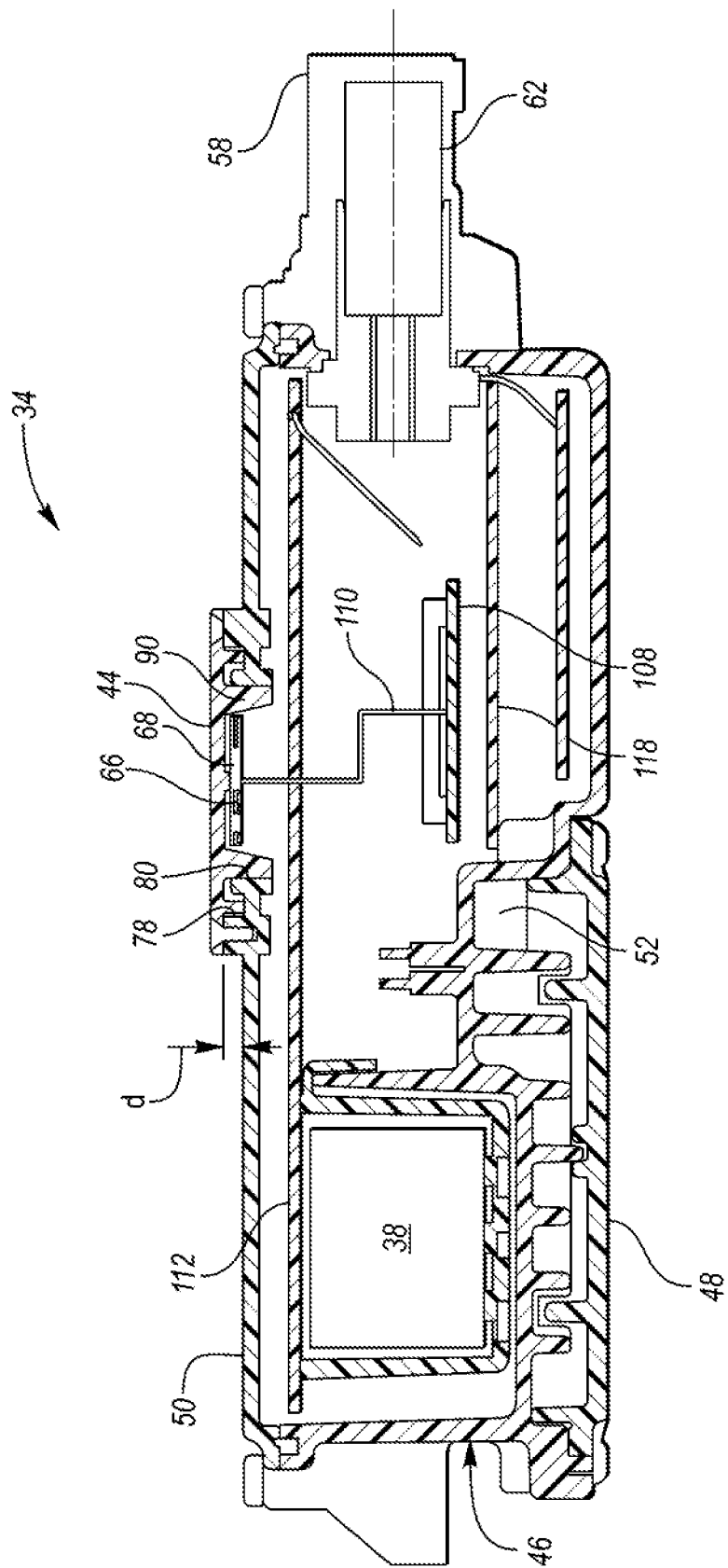
FIG. 5 is a section view of the wireless charging unit in FIG. 3a along cutline 5-5.

FIG. 5 is a section view of the wireless charging unit 34 in FIG. 3a taken along outline 5-5. As previously mentioned, the antenna board 68 and, correspondingly, the antenna 66 may be mounted to an underside 74 of the plastic cover 44. As shown, the antenna board 68 may be disposed above the outside surface 84 of the metal cover 50 by a distance d, yet still be enclosed within the metal enclosure 46 by the plastic cover 44. As previously described, the recess 106 for the antenna 66 in the internal surface 92 of the plastic cover 44 may allow the antenna board 68 to be even closer to the internal surface 92. This, in turn, may allow the antenna 66 and antenna board 68 to be raised even further above the outside surface 84 of the metal cover 50 by the distance d.

A wireless communication control board 108 may be disposed within the interior 52 of the metal enclosure 46. Moreover, the wireless communication control board 108 may be connected to the antenna 66 (e.g., via the antenna board 68) with a cable 110. The cable 110 may be shielded (e.g., a 50 Ohm shield twister pair cable). Together, the antenna 66 (and antenna board 68), the wireless communication control board 108, and the cable 110 may form the wireless communication system 42.

The interior 52 of the metal enclosure 46 may further include high-power electronics, such as the high-power switching network 38, connected to a high-power electronics control board 112. As previously described, the high-power switching network 38 may include an AC/DC rectifier, as well as other high-power electronics, such as an inductor, transistors (e.g., MOSFETs, kilns, or the like), and/or an electromagnetic interference (EMI) filter. The wireless charging unit 34 may also include a main control board. 118 disposed in the interior 52 of the metal enclosure 46. The main control board 118 may provide the main control hub of the wireless charging unit 34 and may be in communication with the wireless communication control board 108 and the high-power electronics control board 112. Further, the main control board 118 may connect to the in-vehicle control network through the control connector 62.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wireless charging unit for an inductive power transfer system in an electric vehicle, the wireless charging unit comprising:
   a high-power switching network configured to receive AC power induced in a secondary coil of the inductive power transfer system and deliver DC power to a battery of the electric vehicle;
   a metal enclosure for enclosing the high-power switching network, the metal enclosure including a cutout region;
   a plastic cover affixed to the metal enclosure overlapping the cutout region;
   an antenna mounted to an underside of the plastic cover;
   a wireless communication control board disposed within the metal enclosure; and
   a cable connecting the antenna to the wireless communication control board.

2. The wireless charging unit of claim 1, wherein the antenna is a chip antenna mounted to an antenna board.

3. The wireless charging unit of claim 2, wherein the metal enclosure includes a metal housing and a metal cover, the cutout region being in the metal cover.

4. The wireless charging unit of claim 3, further comprising a seal disposed along a perimeter of the cutout region between the metal cover and the plastic cover.

5. The wireless charging unit of claim 3, wherein the underside of the plastic cover includes a wall surrounding an internal surface, the wall extending toward an interior of the metal enclosure along a perimeter of the cutout region, the internal surface exposed to the interior of the metal enclosure.

6. The wireless charging unit of claim 5, wherein the wall includes an outer surface having a canal for receiving a seal.

7. The wireless charging unit of claim 5, wherein the internal surface includes mounting posts extending therefrom, the antenna board being mounted to the posts.

8. The wireless charging unit of claim 5, wherein the internal surface includes a recess for the antenna that allows the antenna board to be closer to the internal surface.

9. The wireless charging unit of claim 5, wherein the plastic cover includes a flange surrounding the wall, the flange overlapping the metal cover around the perimeter of the cutout region.

10. The wireless charging unit of claim 9, wherein the flange includes a channel adjacent the wall.

11. The wireless charging unit of claim 10, further comprising an outwardly-extending rim formed in the metal cover surrounding the cutout region, wherein the rim is seated inside the channel in the flange.

* * * * *